United States Patent
Cao

(10) Patent No.: US 9,568,668 B2
(45) Date of Patent: Feb. 14, 2017

(54) BACKLIGHT MODULE AND DISPLAY DEVICE

(71) Applicant: BOE Technology Group Co., Ltd., Beijing (CN)

(72) Inventor: Lei Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 20 days.

(21) Appl. No.: 14/802,492

(22) Filed: Jul. 17, 2015

(65) Prior Publication Data
US 2016/0085021 A1 Mar. 24, 2016

(30) Foreign Application Priority Data
Sep. 22, 2014 (CN) .................... 2014 2 0547319 U

(51) Int. Cl.
*F21V 8/00* (2006.01)

(52) U.S. Cl.
CPC ............. *G02B 6/0088* (2013.01); *G02B 6/005* (2013.01); *G02B 6/009* (2013.01); *G02B 6/0091* (2013.01)

(58) Field of Classification Search
CPC ....... G02B 6/0088; G02B 6/005; G02B 6/009; G02B 6/0091; G02B 6/0086; F21V 21/00; F21V 15/01; F21V 15/012; G02F 1/133308; G02F 2001/133314; G02F 2001/13317; G02F 2001/13332; G02F 1/133602; G02F 1/133608
See application file for complete search history.

(56) References Cited

U.S. PATENT DOCUMENTS

| | | | |
|---|---|---|---|
| 8,622,565 B2 * | 1/2014 | Kawada | F21V 7/04 362/634 |
| 8,698,974 B2 * | 4/2014 | Ro | B29C 45/1418 349/58 |
| 2015/0268410 A1 * | 9/2015 | Yu | G02B 6/0083 349/58 |

\* cited by examiner

Primary Examiner — Bao Q Truong
(74) Attorney, Agent, or Firm — Banner & Witcoff, Ltd.

(57) ABSTRACT

Embodiments of the invention provide a backlight module and a display device. The backlight module comprises an outer frame and an optical component, wherein the outer frame includes a body portion and an extension portion connected with each other, the extension portion is positioned on one side of the body portion and has a first bent portion and a second bent portion integrally formed, the body portion has a central region and a periphery region surrounding the central region, the second bent portion is connected to the periphery region of the body portion through the first bent portion and extends to the central region of the body portion, such that a space for accommodating the optical component is enclosed by the first and second bent portions of the extension portion and the body portion.

17 Claims, 5 Drawing Sheets

BACKLIGHT MODULE AND DISPLAY DEVICE

This application claims priority to Chinese Patent Application No. 201420547319.1 filed on Sep. 22, 2014. The present application claims priority to and the benefit of the above-identified application and is incorporated herein in its entirety.

TECHNICAL FIELD

Embodiments of the invention relate to a backlight module and a display device.

BACKGROUND

A liquid crystal display is a currently prevalent flat panel display product, and a backlight module is one of key parts of the liquid crystal display. As liquid crystals per se emit no light, the backlight module is used for supplying a light source with sufficient brightness and uniform distribution, so that the liquid crystal display can show an image properly.

SUMMARY

An embodiment of the invention provides a backlight module, comprising an outer frame and an optical component, wherein the outer frame includes a body portion and an extension portion connected with each other, the extension portion is positioned on one side of the body portion and has a first bent portion and a second bent portion integrally formed, the body portion has a central region and a periphery region surrounding the central region, the second bent portion is connected to the periphery region of the body portion through the first bent portion and extends to the central region of the body portion, such that a space for accommodating the optical component is enclosed by the first and second bent portions of the extension portion and the body portion.

Another embodiment of the invention provides a display device, comprising a display panel and a backlight disposed on one side of the display panel, wherein the backlight module is the above backlight module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

The technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
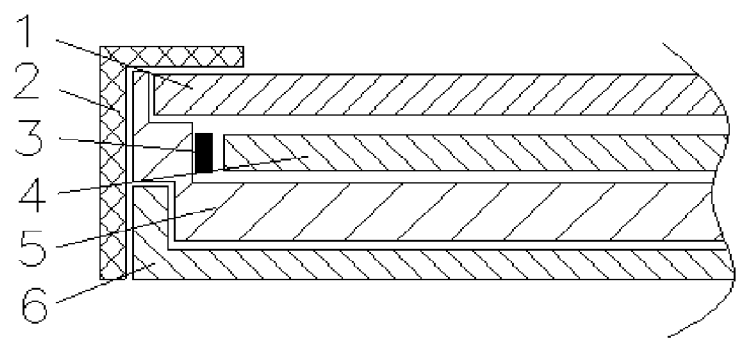
FIG. 1 is a sectional view of a backlight module in a related art.

As shown in FIG. 1, in a package structure of a liquid crystal display in a related art, a light source 3 and an optical film 4, as components of a backlight module, are fixed together by a plastic frame 5 and then integrally packaged with a display panel 1 through an upper metal frame 2 and a lower metal frame 6. With development of a display technology and an increase in market demands, it is desirable to have a larger screen display area and a narrowed frame, and an effective display area of the display panel can be increased by narrowing the frame. Apparently, displays with a narrow frame or even no frame have currently become a main development trend in liquid crystal display industry.

An embodiment of the invention provides a backlight module, comprising an outer frame and an optical component, wherein the outer frame includes a body portion and an extension portion disposed on the body portion; the extension portion is positioned on one side of the body portion and has an first bent portion and second bent portion which are integrally formed with the body portion; the second bent portion is disposed opposite to a plane where the body portion is located and connected to the body portion via the first bent portion; a space for accommodating the optical component is enclosed by the first bent portion and second bent portion of the extension portion and the body portion.

In such a backlight module, instead of fastening the optical component to the display panel by using an additional frame structure, a simple snap-fit outer frame is utilized to accommodate the optical component, thereby achieving a frameless liquid crystal display.

First Embodiment

Figure 2:
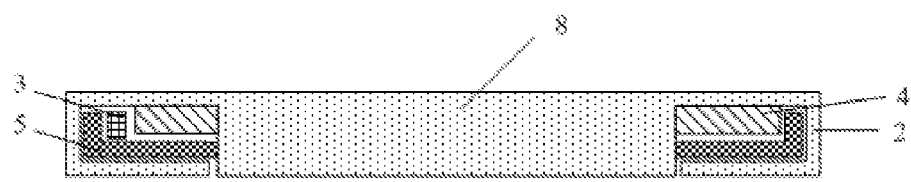
FIG. 2 is a sectional view of a backlight module according to a first embodiment of the invention.

This embodiment provides a backlight module and a display device comprising the backlight module. As shown in FIG. 2, the backlight module comprises an outer frame 8, an optical component such as light source 3, optical film 4, and a plastic frame 5; the outer frame 8 includes a body portion 81 and an extension portion 82 that is bonded to a periphery of the body portion 81. The extension portion 82 is positioned on one side of the body portion 81 and has a first bent portion 821 and second bent portion 822 which are integrally formed. The second bent portion 822 is disposed opposite to a plane where the body portion is located and is connected to the body portion via the first bent portion 821. A space M for accommodating the optical component is enclosed by the body portion 81 and the first bent portion

821 and second bent portion 822 of the extension portion 82. In the embodiment, the space M enclosed by the extension portion 82 and the body portion 81 for accommodating the optical component such as the optical film 4 and the light source 3 also accommodate the plastic frame 5.

Figure 3:
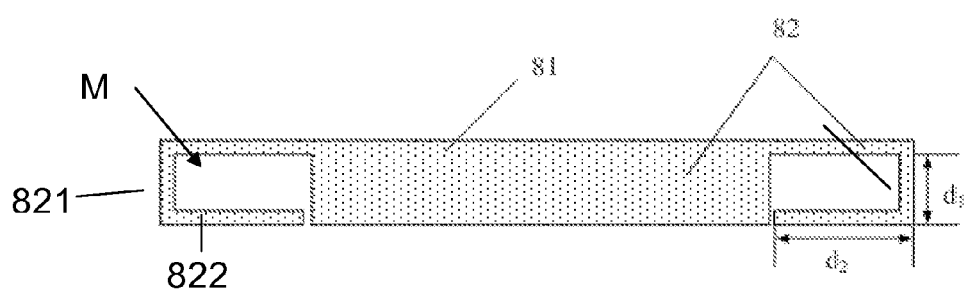
FIG. 3 is a sectional view of an outer frame in FIG. 2.

As shown in FIGS. 2 and 3, the extension portion 82 is provided on outer edge of each side of the body portion 81. Also referring to FIG. 4A-FIG. 4E, the extension portion 82 includes a first bent portion 821 perpendicular to the plane where the body portion 81 is located and a second bent portion 822 parallel to the plane where the body portion 81 is located. In this embodiment, the extension portion 82 is disposed on outer edges of four sides of the body portion 81, such that for the optical film 4 and the housing 5, a good force balance is maintained. The extension portion 82 disposed on four sides of the body portion 81 are bent to have the first bent portion 821 and the second bent portion 822 perpendicular to each other, whereby the plastic frame 5, the optical film 4, and the light source 3 are accommodated and fixed in the space M.

In this embodiment, the body portion 81 and the extension portion 82 of the outer frame 8 are formed integrally.

FIGS. 4A to 4D respectively show a top view, a stereogram, a front view, and a bottom view of the outer frame 8 without bending the extension portion 82.

Figure 4A:
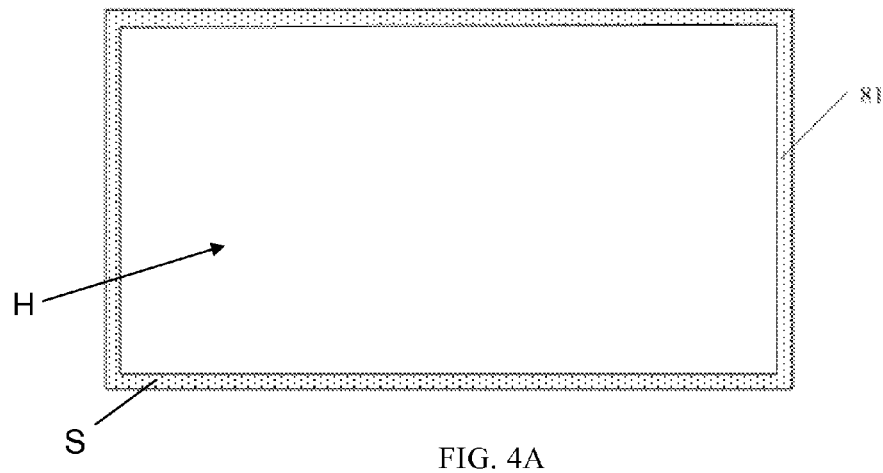
FIG. 4A is a top view of the outer frame in FIG. 3.
Figure 4B:
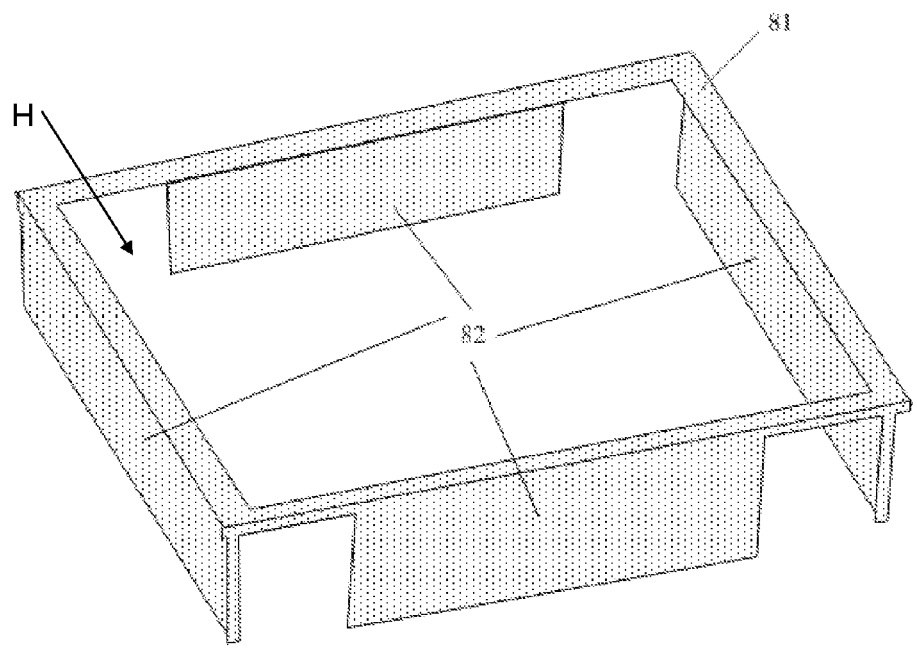
FIG. 4B is a stereogram of the outer frame in FIG. 3 without bending an extension portion.

In this embodiment, the display device is packaged to have a square shape, and the outer frame 8, for example, also has a flat square structure with four side portions correspondingly. As shown in FIGS. 4A and 4B, the body portion 81 is a square frame with four side portions S that define a central opening H. Light from the light source 3 is emitted from the backlight module through the central opening H. For example, the four side portions S constitutes the periphery region of the body portion, and the central opening H is the central region of the body portion. The second bent portion 822 is connected to the periphery region S of the body portion through the first bent portion 821 and extends to the central region H of the body portion, such that a space M for accommodating the optical component is enclosed by the first and second bent portions of the extension portion 82 and the body portion 81.

For example, the extension portion 82 is provided on the outer edges of at least two side portions of the body portion 81 and positioned on a same side of the body portion 81. Herein, the outer edge of the side portion of the square frame refers to an edge of the side portion away from the central opening H; and correspondingly, an inner edge of the side portion of the square frame refers to an edge of the side portion that faces the central opening H.

In a small-sized display device, in order to simplify the structure of the backlight module, the extension portion 82 can be disposed only on the outer edges of two side portions of the body portion 81. For example, the extension portion 82 is disposed on two opposite side portions (left and right side portions, or top and bottom side portions), or, the extension portion 82 is disposed on the outer edges of any three side portions of the body portion 81. An end of the extension portion 82 is bent towards the center of the body portion 81 so as to fix the light source 3, the optical film 4, and the plastic frame 5 effectively.

In other embodiments, the display device may also be packaged to have other shapes, such as a circular or oval shape. In this case, the body portion 81 of the outer frame in the backlight module can accordingly have a similar shape. The extension portion 82 is disposed on the outer edge of the body portion 81 and positioned on the same side of the body portion 81. An end of the extension portion 82 is bent towards the center of the body portion 81 so as to encase the plastic frame 5, the optical film 4, and the light source 3 in the space M enclosed by the extension portion 82 and the body portion 81. In such a manner, a structure of a frameless display device can also be achieved.

Figure 4C:
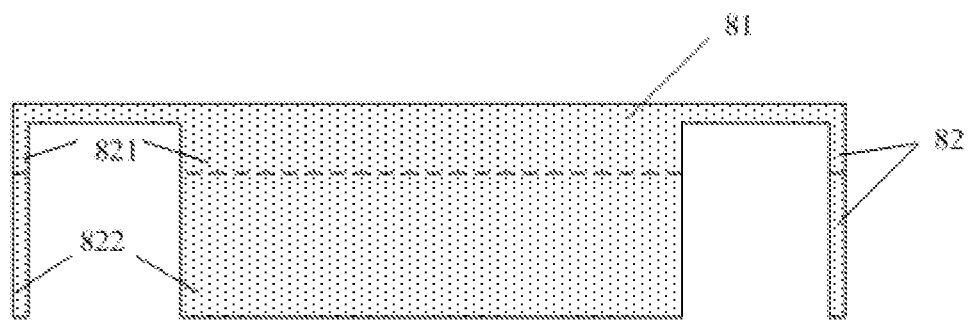
FIG. 4C is a side view of the outer frame in FIG. 3 without bending the extension portion.
Figure 4D:
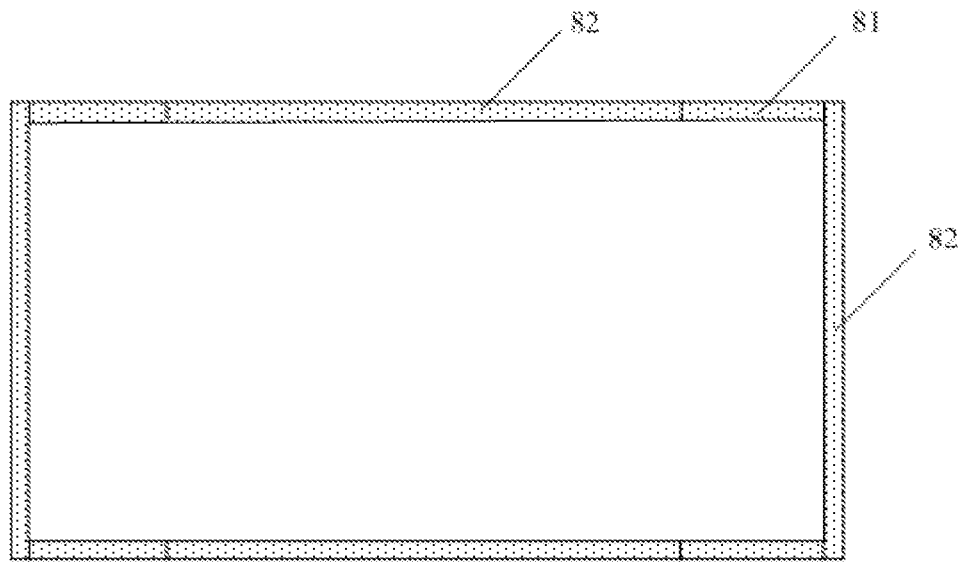
FIG. 4D is a bottom view of the outer frame in FIG. 3 without bending the extension portion.
Figure 4E:
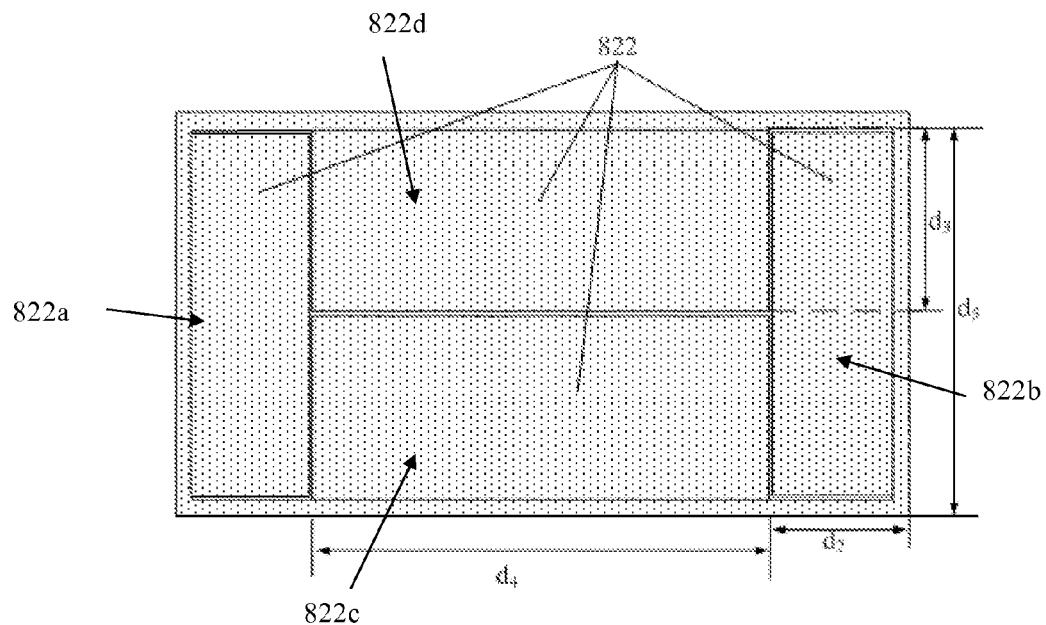
FIG. 4E is a bottom view of the extension portion of the outer frame in FIG. 3.

Referring to FIG. 3 and FIG. 4E, in order to achieve better enclosing and fixation effects, a height $d_1$ of the first bent portion 821 is no less than a sum of thicknesses of the plastic frame 5 and the optical film 4. A gap of 0.1-0.2 mm can be reserved, considering assembling tolerance. In FIG. 4E, widths $d_5$ of a first and second portions 822a and 822b of the second bent portions 822 disposed oppositely in a transverse direction is no greater than a width of the plastic frame 5, a sum of widths $d_3$ of a third and fourth portions 822c and 822d of the second bent portions 822 disposed oppositely in a longitudinal direction is no greater than the width of the plastic frame 5, and a sum of lengths $d_2$ of the first and second portions 822a and 822b of the second bent portions 822 disposed oppositely in a transverse direction and lengths $d_4$ of the third and fourth portions 822c and 822d of the second bent portions 822 disposed oppositely in a longitudinal direction is no greater than a length of the plastic frame 5. That is, a vertical projection of the second bent portion of the extension portion on the plane where the body portion is located is inside an outermost edge of the body portion.

For example, the width/length or the sum of the widths/lengths of the first and second portions 822a and 822b of the second bent portions 822 disposed oppositely in a transverse direction and the third and fourth portions 822c and 822d of the second bent portions 822 disposed oppositely in a longitudinal direction is made as close as possible to the width/length of the plastic frame 5, so that the plastic frame 5 and the optical film 4 are encased to the greatest extent possible, thereby achieving a desirable enclosing effect. Here, the height is defined as a dimension perpendicular to the plane where the body portion 81 is located, and the length/width is defined as a dimension parallel to the plane where the body portion 81 is located. Further, with reference to FIG. 4E, the length is defined in a transverse direction and the width is defined in a longitudinal direction.

Of course, in the backlight module of this embodiment, four portions 822a-822d of the second bent portions of the outer frame can be overlapped with each other in pairs (similar to an overlapped structure for folding carton). In this case, although the outer frame is somewhat heavy and consumes more material, the plastic frame 5 and the optical film 4 can be well encased, thereby achieving a backlight module structure that is more robust. In practical applications, specific dimensions of the bent portions of the outer frame can be selected flexibly depending on the application environment of the backlight module, which is not limited herein.

The backlight module shown in FIG. 2 is an edge-lit backlight module, in which the light source 3 is disposed on a side of the optical film 4.

Among the components of the backlight module, the plastic frame 5 typically has a largest dimension. Therefore, as long as the height of the first bent portion 821 is no less than the sum of the thicknesses of the plastic frame 5 and the optical film 4, the light source 3 can be encased inside the outer frame, so that the light source 3 and the optical film 4 are well protected.

In the top view shown in FIG. 4A, the body portion 81 is a square frame with four strip side portions. In the schematic views of FIGS. 4C-4D showing the outer frame 8 in FIG. 3 without bending the extension portion 82, the extension portion 82 is disposed on the same side of the outer edges of the four side portions of the body portion 81. In the schematic view of FIG. 4E showing the outer frame 8 in FIG. 3, the first bent portion 821 and the second bent portion 822 of the outer frame 8 that form a right bending angle so as to encase the plastic frame 5 and the optical film 4 therein. Here, the top view is taken from such a viewing perspective that the backlight module is orientated in an assembled state, that is, the body portion 1 is disposed above the light source 3.

Figure 5:
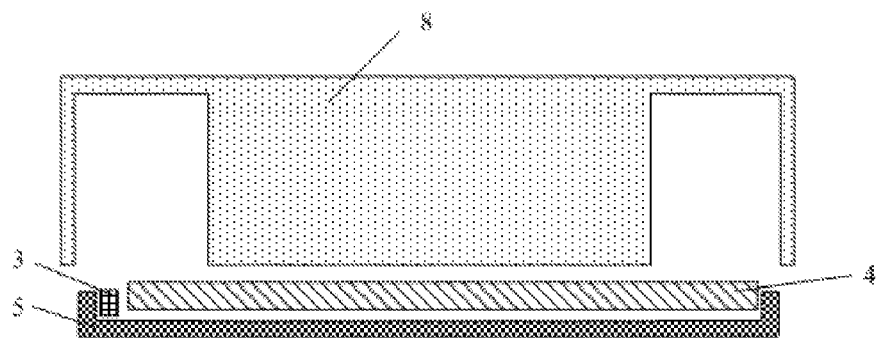
FIG. 5 is an exploded view of the backlight module in FIG. 2 without bending the extension portion.
Figure 6:
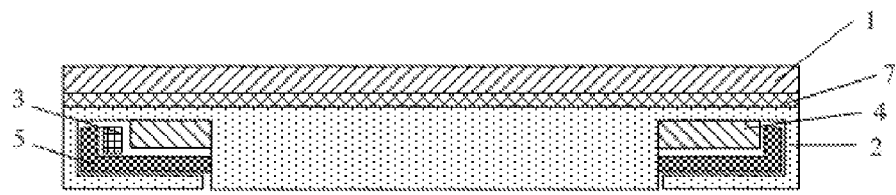
FIG. 6 is a side view of a display device according to the first embodiment of the invention.

FIG. 5 is an exploded view of the backlight module in FIG. 2. During assembling the backlight module, as shown in FIG. 5, the optical film 4 and the light source 3 (such as a LED light bar) can be placed in the plastic frame 5; then, the plastic frame 5 is placed against the body portion 81 of the outer frame 8, and then a bending angle is formed between the first bent portion 821 and the second bent portion 822 by using a stamping process, so as to encase the plastic frame 5, the optical film 4, and the light source 3 in a space enclosed by the body portion 81 and the first bent portion 821 and the second bent portion 822 of the extension portion 82.

For example, the outer frame 8 is made of iron, aluminium, or stainless steel. Such materials are readily available, usually have a good mechanical strength, and can be easily bent by using a relevant process; and therefore, they are suitable for forming the outer frame 8 of the backlight module according to this embodiment.

Furthermore, in the outer frame 8, the body portion 81 and the extension portion 82 are integrated and have the same thickness. As such, the process of producing a blank for the outer frame 8 of FIGS. 4A-4C is simple and the outer frame 8 has good overall mechanical strength.

In this embodiment, the light guide member 4, for example, includes a light guide plate and an optical film sheet bonded thereto. The optical film sheet, for example, can include a diffusion sheet and a prism sheet, or alternatively can further include a protect sheet. The diffusion sheet serves to provide a uniform light source to the liquid crystal display, and the prism sheet serves to gather the diffused light from the diffusion sheet so as to increase the brightness of the backlight module.

Correspondingly, this embodiment also provides a display device comprising a display panel 1 and a backlight module disposed on a side of the display panel 1. The backlight module is the above backlight module.

In the display device of this embodiment, based on a backlight module that has been assembled, the outer frame 8 and the display panel 1 are connected by means of adhesion. Specifically, the display panel 1 is adhered to the surface of the body portion 81 away from the extension portion 82 through double-sided adhesive 7, corresponding to the square central opening H of the body portion 81. As the body portion 81 is a square frame that matches the shape of the display panel 1, good light transmittance of the backlight module can be ensured. At this time, a liquid crystal screen of the display panel 1 is located on an outermost layer. Without an additional frame structure to fix the liquid crystal screen, the display panel 1 and the backlight module are integrally connected by means of adhesion, so that a frameless liquid crystal screen is achieved, an effective display area of the liquid crystal module is increased, and a resulting display device is lighter and thinner and more aesthetically pleasing.

The display device can be product or component with display function, such as a liquid crystal panel, e-paper, a cell phone, a tablet computer, a television, a monitor, a laptop, a digital photo frame, a navigator, and so on.

In the backlight module of this embodiment, a simple snap-fit structure of the outer frame is utilized, and no additional frame structure is required for fixing the display panel. Therefore, a frameless liquid crystal display is achieved, an effective display area of the liquid crystal module is increased, and the resulting display device is lighter and thinner and more aesthetically pleasing. Also, as fewer parts are utilized, the production costs are lowered. Besides, it is more feasible and convenient to piece up a super-large liquid crystal screen with better effects.

In addition to the edge-lit backlight module shown in FIG. 2, the backlight module of this embodiment can also be a direct-type backlight module, in which case the light source 3 is disposed on the bottom of the backlight module in contrast to the edge-lit backlight module shown in FIG. 2, which will not be described in detail herein.

Second Embodiment

This embodiment provides a backlight module and a display device comprising the backlight module.

Figure 7:
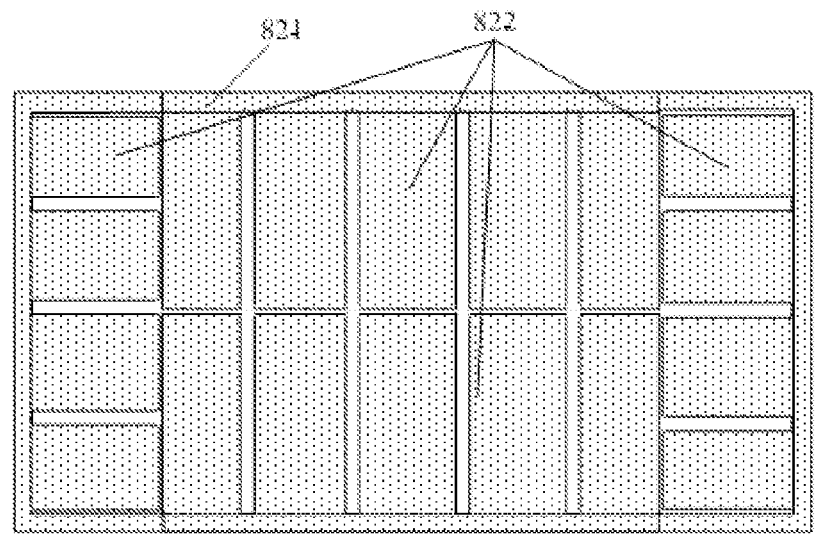
FIG. 7 is a bottom view of an outer frame according to a second embodiment of the invention.
Figure 8:
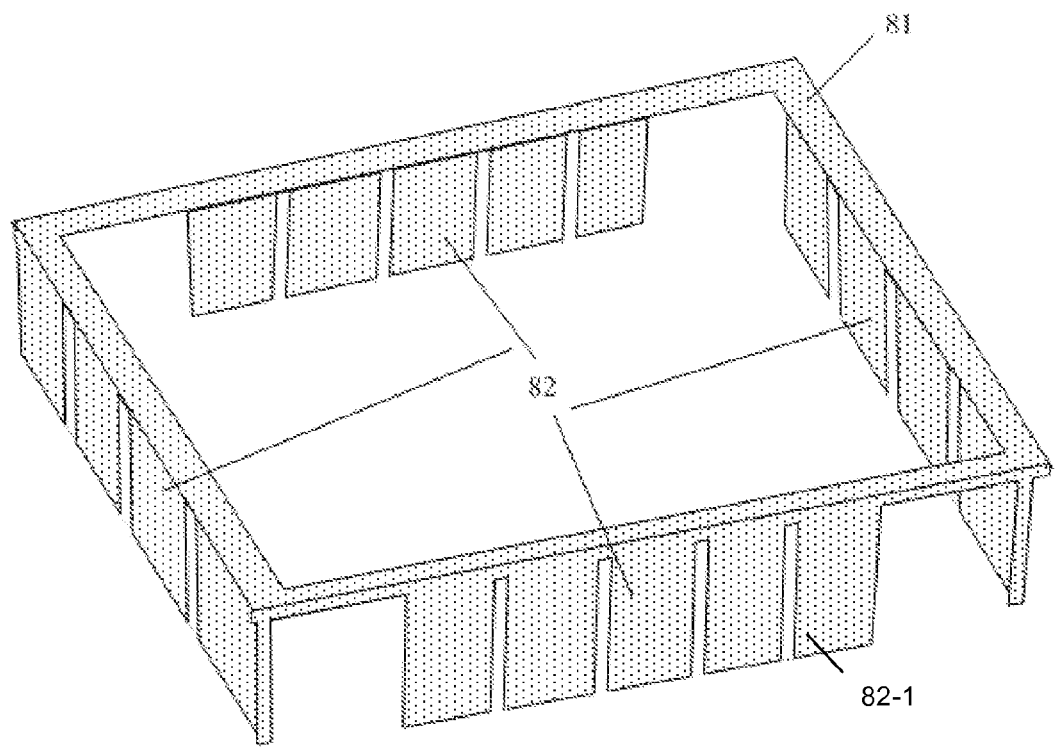
FIG. 8 is a stereogram of the outer frame in FIG. 7 without bending an extension portion.

As shown in FIGS. 7-8, the backlight module can have a substantially same structure as the backlight module provided by the first embodiment except for the extension portion 82. Therefore, description of the same or like components will be omitted here, and the same or like components are denoted by the same terms and the same or like reference signs.

In contrast to the first embodiment, the extension portion 82 of the outer frame 8 in this backlight module can be disposed in a segmented manner on each of the four side portions of the body portion 81 in square frame shape, and are configured to make the plastic frame, the optical film, and the light source are combined integrally.

As shown in FIGS. 7 and 8, in the outer frame 8 of the backlight module of this embodiment, the extension portion 82 includes a plurality of sub-extension portions 82-1 that are spaced apart on the outer edge of each side portion of the body portion 81. Each sub-extension portion 82-1 includes a first sub-bent portion 821-1 perpendicular to the body portion and a second sub-bent portion 822-1 parallel to the plane where the body portion is located. In this way, better heat dissipation is achieved for the backlight module as compared with the first embodiment.

It should be understood that in FIGS. 7 and 8, a parallel branching structure of a plurality of sub-extension portions is used as an example. However, the structure of sub-extension portions arranged at intervals is not limited thereto. As long as the sub-extension portions extended from the outer edge of the side of the body portion can encase the plastic frame, the optical film, and the light source, the specific structure of the sub-extension portions and their positions with respect to each other are not limited.

In the backlight module of the first and second embodiments, the outer frame adopts a simple snap-fit structure functioning as the combination of an upper bezel and a lower bezel of the related art in encasing the optical film, the light source, and the plastic frame, and the backlight module is bonded with the display panel by means of adhesion, so that no additional frame structure is required for fastening the backlight module to the display panel. In this way, a frameless liquid crystal display is achieved, an effective display area of the liquid crystal module is increased, and the resulting display device is lighter and thinner and more aesthetically pleasing. Also, as fewer parts are utilized, the production costs are lowered. Besides, it is more feasible and convenient to piece up a super-large liquid crystal screen with better effects.

Although the backlight module provided by the foregoing embodiments includes a plastic frame 5 for supporting and fixing the light source 3 and the light guide member 4, the plastic frame 5 is not necessary in other embodiments.

Although in the backlight module provided by the foregoing embodiments, the first bent portion 821 and the second bent portion 822 of the extension portion 82 are formed to be perpendicular to each other, the first bent portion 821 and the second bent portion 822 of the extension portion 82 can be formed not to be perpendicular to each other in other embodiments.

In another embodiment, the body portion 81 can be a flat plate without openings; correspondingly, the second extending portion bent portions 82 can define a central opening for light from the light source exiting the backlight module.

In another embodiment, the backlight module can also include a shielding member for preventing light emitted from the light source from exiting the backlight through the portions other than the central opening H.

According to the above description, the embodiments according to the present disclosure at least can provide structures as follows:

(1). A backlight module comprising an outer frame and an optical component, wherein the outer frame includes a body portion and an extension portion connected with each other, the extension portion is positioned on one side of the body portion and has a first bent portion and a second bent portion integrally formed, the body portion has a central region and a periphery region surrounding the central region, the second bent portion is connected to the periphery region of the body portion through the first bent portion and extends to the central region of the body portion, such that a space for accommodating the optical component is enclosed by the first and second bent portions of the extension portion and the body portion.

(2). The backlight module according to (1), wherein the body portion is a square frame having four side portions that define a central opening, so that light from the light source exits the backlight module through the central opening, the four side portions constitutes the periphery region of the body portion, and the central opening is the central region of the body portion.

(3). The backlight module according to (1) or (2), wherein, the first bent portion of the extension portion is perpendicular to the plane where the body portion is located, and the second bent portion of the extension portion is parallel to the plane where the body portion is located.

(4). The backlight module according to any one of (1) to (3), wherein the first bent portion of the extension portion is disposed on at least two side portions of the body portion.

(5). The backlight module according to (4), wherein the first bent portion of the extension portion is disposed on each of the four side portions of the body portion.

(6). The backlight module according to any one of (2) to (5), wherein the extension portion disposed on each side portion of the body portion includes a plurality of sub-extension portions arranged at intervals, each of the sub-extension portions including a first sub-bent portion perpendicular to the plane where the body portion is located and a second sub-bent portion parallel to the plane where the body portion is located.

(7). The backlight module according to any one of (1) to (6), wherein a vertical projection of the second bent portion of the extension portion on the plane where the body portion is located inside an outermost edge of the body portion.

(8). The backlight module according to any one of (1) to (7), wherein the first bent portion and the second bent portion are formed by a stamping process.

(9). The backlight module according to any one of (1) to (8), wherein the outer frame is made of a metal material.

(10). The backlight module according to (9), wherein the metal material includes iron, aluminum, and stainless steel.

(11). The backlight module according to any one of (1) to (10), wherein the body portion of the outer frame is integrally formed with the extension portion.

(12). The backlight module according to (11), wherein the body portion of the outer frame has a thickness same as that of the extension portion.

(13). The backlight module according to any one of (1) to (13), wherein the optical component includes a light source and a light guide member.

(14). The backlight module according to (13), wherein the light guide member includes a light guide plate and an optical film sheet disposed thereon.

(15). The backlight module according to (13), further comprising a plastic frame for supporting and fixing the light source and the light guide member.

(16). A display device comprising a display panel and a backlight module disposed on one side of the display panel, wherein the backlight module is the backlight module according to any one of (1) to (15).

(17). The display device according to (16), wherein the outer frame is bonded to the display panel by means of adhesion.

Although the embodiment of the invention has been described above in great detail with general descriptions and specific embodiments, on the basis of the embodiment of the invention, various changes and improvements may be made, which is apparent to those skilled in the art. Therefore, all such changes and improvements without departing from the spirit of the invention are within the scope of the claims of the invention.

The present application claims priority of Chinese Patent Application No. 201420547319.1 filed on Sep. 22, 2014, the disclosure of which is incorporated herein by reference in its entirety as part of the present application.

What is claimed is:

1. A backlight module comprising an outer frame and an optical component, wherein the outer frame includes a body portion and an extension portion connected with each other, the extension portion is positioned on one side of the body portion and has a first bent portion and a second bent portion integrally formed, the body portion has a central region and a periphery region surrounding the central region, the second bent portion is connected to the periphery region of the body portion through the first bent portion and extends to the central region of the body portion, such that a space for accommodating the optical component is enclosed by the first and second bent portions of the extension portion and the body portion.

2. The backlight module according to claim 1, wherein the body portion is a square frame having four side portions that define a central opening, so that light from the light source exits the backlight module through the central opening, the four side portions constitutes the periphery region of the body portion, and the central opening is the central region of the body portion.

3. The backlight module according to claim 1, wherein, the first bent portion of the extension portion is perpendicular to the plane where the body portion is located, and the second bent portion of the extension portion is parallel to the plane where the body portion is located.

4. The backlight module according to claim 2, wherein the first bent portion of the extension portion is disposed on at least two side portions of the body portion.

5. The backlight module according to claim 2, wherein the first bent portion of the extension portion is disposed on each of the four side portions of the body portion.

6. The backlight module according to claim 2, wherein the extension portion disposed on each side portion of the body portion includes a plurality of sub-extension portions arranged at intervals, each of the sub-extension portions including a first sub-bent portion perpendicular to the plane where the body portion is located and a second sub-bent portion parallel to the plane where the body portion is located.

7. The backlight module according to claim 1, wherein a vertical projection of the second bent portion of the extension portion on the plane where the body portion is located inside an outermost edge of the body portion.

8. The backlight module according to claim 1, wherein the first bent portion and the second bent portion are formed by a stamping process.

9. The backlight module according to claim 1, wherein the outer frame is made of a metal material.

10. The backlight module according to claim 9, wherein the metal material includes iron, aluminum, and stainless steel.

11. The backlight module according to claim 1, wherein the body portion of the outer frame is integrally formed with the extension portion.

12. The backlight module according to claim 11, wherein the body portion of the outer frame has a thickness same as that of the extension portion.

13. The backlight module according to claim 1, wherein the optical component includes a light source and a light guide member.

14. The backlight module according to claim 13, wherein the light guide member includes a light guide plate and an optical film sheet disposed thereon.

15. The backlight module according to claim 13, further comprising a plastic frame for supporting and fixing the light source and the light guide member.

16. A display device comprising a display panel and a backlight module disposed on one side of the display panel, wherein the backlight module is the backlight module according to claim 1.

17. The display device according to claim 16, wherein the outer frame is bonded to the display panel by means of adhesion.

* * * * *